(12) United States Patent
Muenzer et al.

(10) Patent No.: US 11,882,404 B2
(45) Date of Patent: Jan. 23, 2024

(54) MOBILE COMMUNICATIONS DEVICE WITHOUT PHYSICAL SCREEN-OPENING FOR AUDIO

(71) Applicant: ams AG, Premstaetten (AT)

(72) Inventors: Martin Muenzer, Katharein (AT); Peter Trattler, Graz (AT)

(73) Assignee: AMS AG, Premstaetten (AT)

( * ) Notice: Subject to any disclaimer, the term of this patent is extended or adjusted under 35 U.S.C. 154(b) by 190 days.

(21) Appl. No.: 17/605,809

(22) PCT Filed: Apr. 22, 2020

(86) PCT No.: PCT/EP2020/061193
§ 371 (c)(1),
(2) Date: Oct. 22, 2021

(87) PCT Pub. No.: WO2020/216784
PCT Pub. Date: Oct. 29, 2020

(65) Prior Publication Data
US 2022/0174426 A1 Jun. 2, 2022

Related U.S. Application Data

(60) Provisional application No. 62/837,491, filed on Apr. 23, 2019.

(51) Int. Cl.
| | |
|---|---|
| H04R 23/00 | (2006.01) |
| G10K 15/04 | (2006.01) |
| H04R 1/02 | (2006.01) |
| G01J 1/42 | (2006.01) |

(52) U.S. Cl.
CPC ......... *H04R 23/008* (2013.01); *G10K 15/046* (2013.01); *H04R 1/028* (2013.01); *G01J 1/4204* (2013.01); *H04R 2499/11* (2013.01); *H04R 2499/15* (2013.01)

(58) Field of Classification Search
CPC .. H04R 23/008; H04R 1/028; H04R 2499/11; H04R 2499/15; G10K 15/046; G01J 1/4204
See application file for complete search history.

(56) References Cited

U.S. PATENT DOCUMENTS

| | | | | |
|---|---|---|---|---|
| 2014/0070080 | A1* | 3/2014 | Ruh | G01J 1/0422 250/216 |
| 2017/0238102 | A1* | 8/2017 | Shah | G01N 21/4795 398/132 |
| 2021/0217402 | A1* | 7/2021 | Wynn | G10K 15/046 |

FOREIGN PATENT DOCUMENTS

JP 2017175622 A * 9/2017 ........... H04R 23/006

OTHER PUBLICATIONS

International Search Report and Written Opinion for corresponding patent application No. PCT/EP2020/061193 dated Jul. 10, 2020.

* cited by examiner

*Primary Examiner* — Oyesola C Ojo
(74) *Attorney, Agent, or Firm* — TAROLLI, SUNDHEIM, COVELL & TUMMINO L.L.P.

(57) ABSTRACT

A mobile communications device that does not have a physical opening on the screen for audio is operable to transmit a signal to which a photoacoustic effect can be employed by interaction with water vapor in an ear of a user so as to generate audio in the ear or the immediate vicinity of the user's ear. Related methods, apparatuses, systems, techniques and articles are also described.

22 Claims, 6 Drawing Sheets

MOBILE COMMUNICATIONS DEVICE WITHOUT PHYSICAL SCREEN-OPENING FOR AUDIO

RELATED APPLICATIONS

The present invention is a U.S. National Stage under 35 USC 371 patent application, claiming priority to Serial No. PCT/EP2020/061193, filed on Apr. 22, 2020; which claims priority of U.S. 62/837,491 filed on Apr. 23, 2019, the entirety of both of which are incorporated herein by reference.

TECHNICAL FIELD

The subject matter described herein relates to a mobile communications device that does not have a physical opening in the screen for audio. More particularly, the mobile communications device is designed to configure and transmit a signal to which a photoacoustic effect can be employed by interaction with humidity in an ear of a user so as to generate audio in the ear (or an immediate vicinity of the ear) of the user.

BACKGROUND

The screen of many traditional mobile communications devices—such as a mobile phone—has a physical screen-opening, through which an audio signal can be sent from a speaker behind the screen to a human ear. Such opening can be disadvantageous, as the opening can reduce the amount of screen-space that can be used for display. To cure this deficiency of making an undesirable opening in the glass of the screen, a piezoelectric speaker can be used behind the screen. However, such use of a piezoelectric speaker can be disadvantageous as well, as the mechanical motion caused by the piezoelectric speaker results in undesirable and annoying vibrations of the glass of the screen. In addition to such unwanted vibrations, the vibrations generate an audio signal that is not restricted to the ear (or even the vicinity of the ear) of the user, thereby potentially compromising the privacy of the conversation, especially when the mobile communications device is used in a populated area.

SUMMARY

The present disclosure describes a mobile communications device that does not have a physical opening on the screen for audio, and is designed to configure and transmit a signal to which a photoacoustic effect can be employed by interaction with water vapor in an ear of a user so as to generate audio in the ear (or an immediate vicinity of the ear) of the user.

In one aspect, a mobile communications device is described that can include a display screen, a modulator, and a laser. The modulator can be operable to produce a modulated signal based on a signal from a signal generator. The laser can be operable to produce a modulated output laser signal based on the modulated signal. The modulated output laser signal can pass through the display screen for interaction with water vapor in an ear of a user of the mobile communications device to generate audio.

In some implementations, one or more of the following features may be present. The sensor can be a part of an optical module within the mobile communications device. The display screen may not have an audio opening. The modulator can be a part of a sensor configured to detect proximity of a user from the sensor. The sensor can include at least one microprocessor configured to detect the proximity. The at least one microprocessor can be coupled to a microcontroller. The microcontroller can control, based on the detection of the proximity, generation of the signal by the signal generation apparatus.

The modulator can additionally or alternately be a part of a sensor configured to detect ambient light in vicinity of the sensor. The sensor can include at least one microprocessor configured to perform the detection of the ambient light. The at least one microprocessor can be coupled to a microcontroller. The microcontroller can control, based on the detection of the ambient light, generation of the signal by the signal generation apparatus.

The laser can have a near-infrared wavelength. The near-infrared wavelength can be 1.9 micrometers (μm).

In another aspect, a signal generation apparatus within a mobile communications device can generate a signal quantified based on at least one of ambient light and proximity of a user of the mobile communications device. A modulator within the mobile communications device can modulate the signal to generate a modulated signal. A laser within the mobile communications device can produce a modulated output laser signal based on the modulated signal. The modulated output laser signal can be transmitted, via an optical device within the mobile communications device, through a display screen of the mobile communications device. The modulated output laser signal can interact with water vapor in an ear of a user of the mobile communications device to generate audio.

In some implementations, one or more of the following features may be present. The laser can have a near-infrared wavelength. In one example, the near-infrared wavelength can be between 0.7 μm and 5 μm. In another example, the near-infrared wavelength can be 1.9 μm. The display screen may not have an audio opening. The audio can be audible when the ear of the user is at a distance between zero millimeters and 1.5 centimeters from the mobile communications device.

In yet another aspect, a system can include: at least one programmable processor of a sensor located within a mobile communications device; and a machine-readable medium storing instructions that, when executed by the at least one processor, cause the at least one programmable processor to perform operations comprising: receiving an instruction from a microcontroller to begin detection of at least one of proximity of a user of the mobile communications device from the sensor and ambient light; detecting, in response to the receipt of the instruction, values of the proximity and ambient light; and transmitting the values of the proximity and the ambient light to the microcontroller, the microcontroller instructing a signal generation apparatus to generate a signal quantified based on the values of the proximity and the ambient light, the signal being modulated by a modulator within the sensor to generate a modulated signal, a laser producing a laser signal coupled to the sensor the modulated signal being converted into a modulated output laser signal by, the modulated output laser signal passing through a display screen of the mobile communications device for interaction with water vapor in an ear of a user of the mobile device to generate audio.

In some implementations, one or more of the following features may be present. The laser can have a near-infrared wavelength. The near-infrared wavelength can be 1.9 μm. The display screen does not have an audio opening. The audio can be audible when the ear of the user is at a distance between zero millimeters and 1.5 centimeters from the mobile communications device.

Some implementations provide one or more of the following advantages. For example, the mobile communications device does not have a physical opening on the screen for audio, which in turn can increase the amount of screen space available for display. Additionally, the signal emitted by the mobile communications device is configured to generate audio upon combination with humidity in the ear of a user, thereby generating audio in the ear (or an immediate vicinity of the ear) of the user, which preserves the privacy of the communications.

The details of one or more implementations are set forth below. Other features and advantages of the subject matter will be apparent from the detailed description, the accompanying drawings, and the claims.

DETAILED DESCRIPTION

Figure 1:
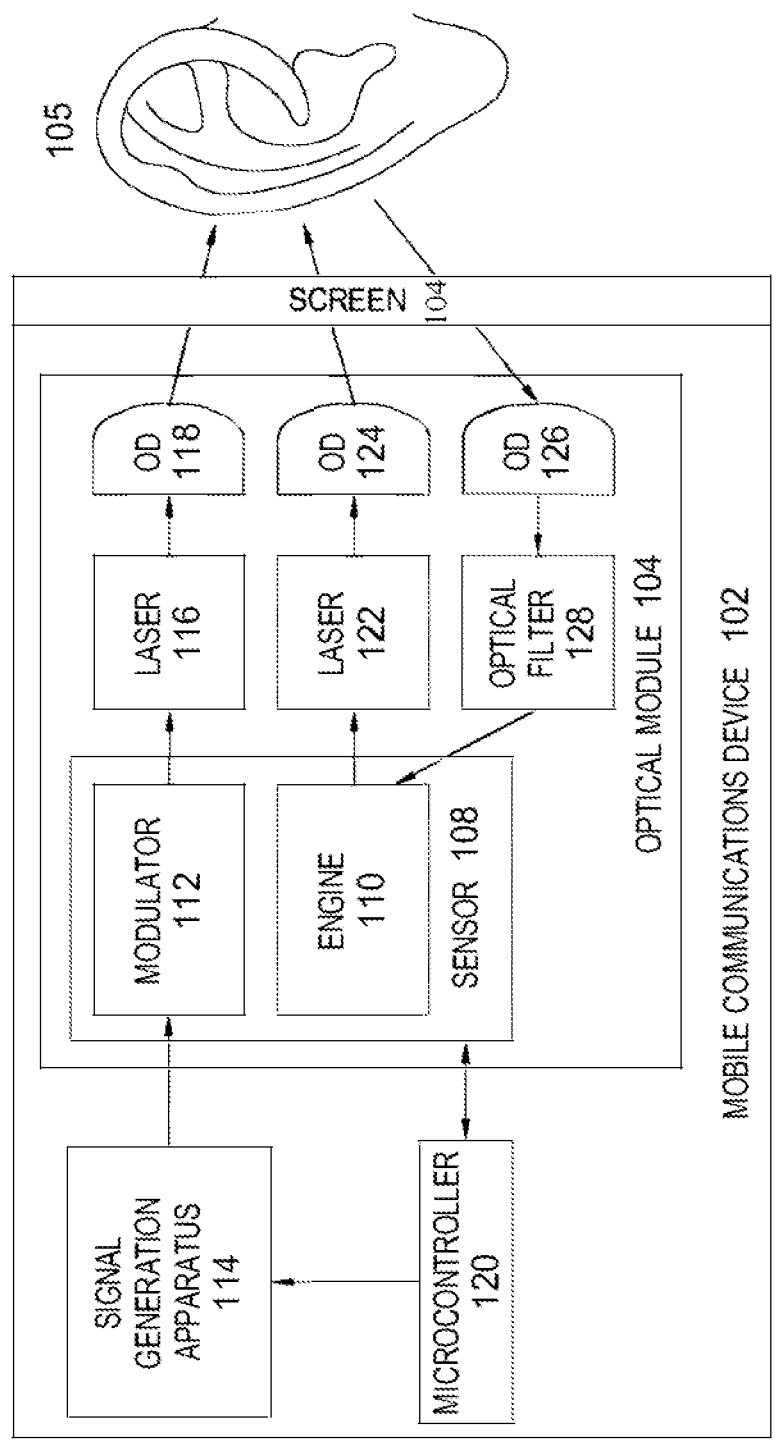
FIG. 1 illustrates an example of a mobile communications device.

FIG. 1 illustrates a mobile communications device 102 that does not have a physical opening (which can also be referred to as a carving or cut-out of the glass, hole in the glass, and/or the like) on a display screen 104 for audio, and is designed to configure and transmit, to an ear 105 of a user of the mobile communications device 102, a laser signal to which a photoacoustic effect can be employed by interaction with humidity (e.g., vapor, such as water vapor) in the ear 105 so as to generate audio in the ear 105 (or an immediate vicinity of the ear 105). The mobile communications device 102 can include an optical module 106 underneath the screen 104. The optical module 106 can generate the laser signal that passes through the screen 104.

The optical module 104 can include a sensor 108 configured to sense proximity of the user of the mobile communications device 102 to the sensor 108 (i.e., distance between the mobile communications device 102 and the user), and an amount of ambient light. The sensor 108 can thus be a combination of a proximity sensor and an ambient light sensor. Although the sensor 108 is described as detecting proximity and ambient light, in alternate implementations, any other optical sensor to detect any other relevant parameter can be used. The sensor 108 can include an engine 110 that is operable to perform the processing of detected signals representing proximity and ambient light, and a modulator 112 that can modulate a signal generated by a signal generating device 114 to generate a modulated signal. The modulation can be amplitude modulation or pulse width modulation (PWM). The signal generation device 114 can generate an analog audio signal or a digital audio signal. The engine 110 can be include, for example one or more microprocessors and/or other circuitry. The engine 110 can be communicatively coupled to the microcontroller 134 via an inter-integrated circuit (I$^2$C) interface (see FIG. 4) or VC bus. The I$^2$C interface is a bus that can be used to facilitate communication between two or more components (e.g., the engine 110 and the microcontroller 120). Although the I$^2$C bus and the I$^3$C bus are described, in other implementations any other serial computer bus can be used instead.

The optical module 104 further can include a laser 116 operable to receive the modulated signal from the modulator 112. The laser 116 can be a surface emitting laser or an edge emitting laser. In some implementations, the laser 116 can be a vertical-cavity surface-emitting laser (VCSEL) such as a 1.9 micrometers (μm) thulium laser. The term VCSEL, as used herein, can refer to a semiconductor laser—such as a laser diode with a monolithic laser resonator—where the emitted light emerges from the surface of the device in a direction perpendicular to the chip surface. While the laser 116 is described as having a wavelength of 1.9 μm, in alternate implementations, the laser 116 may have any near-infrared wavelength, which can range between 0.7 μm and 5 μm. The laser 116 can emit light based upon the current flowing through the laser. Although the laser 116 is described as a VCSEL, in alternate implementations the laser 116 can be any other semiconductor laser such as a double hetero-structure laser, a quantum well laser, a quantum cascade laser, an inter-band cascade laser, a distributed Bragg reflector laser, a distributed feedback laser, a vertical external-cavity surface-emitting laser (VECSEL), external cavity diode laser, any other one or more semiconductor lasers, and/or any combination thereof.

The optical device 118 can be operable to receive the encoded signal from the laser 116. The optical device 118 can include, for example, a lens, and optically can concentrate or disperse the encoded signal to generate an optically processed signal.

The screen 104 is operable to receive the optically processed signal from the optical device 118. The screen 104 can transmit the optically processed signal to the user's ear 105. The optically processed signal has been configured, by at least the laser 116, to interact with humidity (e.g., water vapor) typically present in a human ear to generate audio based on the photoacoustic effect. The audio can be audible (e.g., the audio can range from 40 decibels to 80 decibels) when the ear 105 of the user is adjacent to or in the vicinity of the mobile communications device 102 (e.g., at a distance between zero millimeters and 1.5 centimeters from the mobile communications device 102). In an alternate implementation, the audio can be audible (e.g., the audio can range from 0 decibel to 130 decibels) even when the ear 105 is at a distance up to two and a half meters away from the mobile communications device 102. At a distance of two and a half meters from the mobile communications device 102, the audio can range between 40 decibels and 70 decibels. In alternate implementations, the audio can be audible (e.g., the audio can range from 0 decibel to 130 decibels) at a distance greater than two and a half meters away from the mobile communications device 102. For example, at a distance of five meters from the mobile communications device 102, the audio can range between 20 decibels and 40 decibels. At a distance of ten meters from the mobile communications device 102, the audio can range between 0 decibel and 20 decibels.

The amount of audio being generated in the ear 105 can be varied by varying the value of the signal generated by the signal generation apparatus 114. The value of the signal generated by the signal generation apparatus 114 can be controlled by a microcontroller 120 communicatively coupled to the engine 110. For example, the microcontroller 120 can vary the value of the signal generated by the signal generation apparatus 114 by instructing the signal generation apparatus 114 to do so based on the proximity of the user and an ambient light, both of which are determined by the engine 110.

Sensing of the proximity and ambient light by the engine 110 is now described. The engine 110 generates an inquiry signal to determine, one at a time, proximity and ambient light values. The optical module 104 further can include another laser 122. The laser 122 can be an edge emitting laser or a surface emitting laser. In one implementation, the laser 122 can be a VCSEL operable, e.g., to emit light at 940 nm. Although the laser 122 is described as a VCSEL, in alternate implementations the laser 116 can be any other semiconductor laser such as a double hetero-structure laser, a quantum well laser, a quantum cascade laser, an inter-band cascade laser, a distributed Bragg reflector laser, a distributed feedback laser, a vertical external-cavity surface-emitting laser (VECSEL), external cavity diode laser, any other one or more semiconductor lasers, and/or any combination thereof. The laser 122 is operable to receive the inquiry signal. The laser 122 can convert the inquiry signal to a corresponding inquiry laser signal. The optical module 104 also can include an optical device 124, which can be a lens to receive the inquiry laser signal from the laser 122. The optical device 124 can concentrate or disperse the encoded signal to generate an optically processed inquiry signal. The optically processed inquiry signal can interact with the user's ear 105 and return (e.g., by reflection from the ear) to another optical device 126, which also can be a part of the optical module 104. The returned/reflective signal can be indicative of the proximity and/or ambient light.

The optical device 126 can be operable to receive the reflected signal, and concentrate or disperse the reflected signal. The optical module 104 further can include an optical filter 128 to filter the concentrated or dispersed signal in order to be compatible with the engine 110. The engine 110 can receive the filtered signal, which indicates the values of the proximity of the user and the ambient light. The engine 110 then can process the filtered signal. Such processing can include, for example, converting analog data to digital data so as to enable communication between the engine 110 and the microcontroller 120.

The microcontroller 120 can be operable to receive from the engine 110 the digital values of the processed signal indicative of proximity and ambient light, and to control the signal generation apparatus 114 based on the proximity and ambient light values.

Although the optical devices 118, 124 and 126 are described above as lenses, in alternate implementations, any of the optical devices 118, 124 and 126 can include an organic light emitting diode (OLED) panel. In other alternate implementations, any of the optical devices 118, 124 and 126 can include one or more of: at least one micro lens array (MLA), at least one diffusor, at least one aperture, any other one or more optical devices, and/or any combination thereof.

Figure 2:
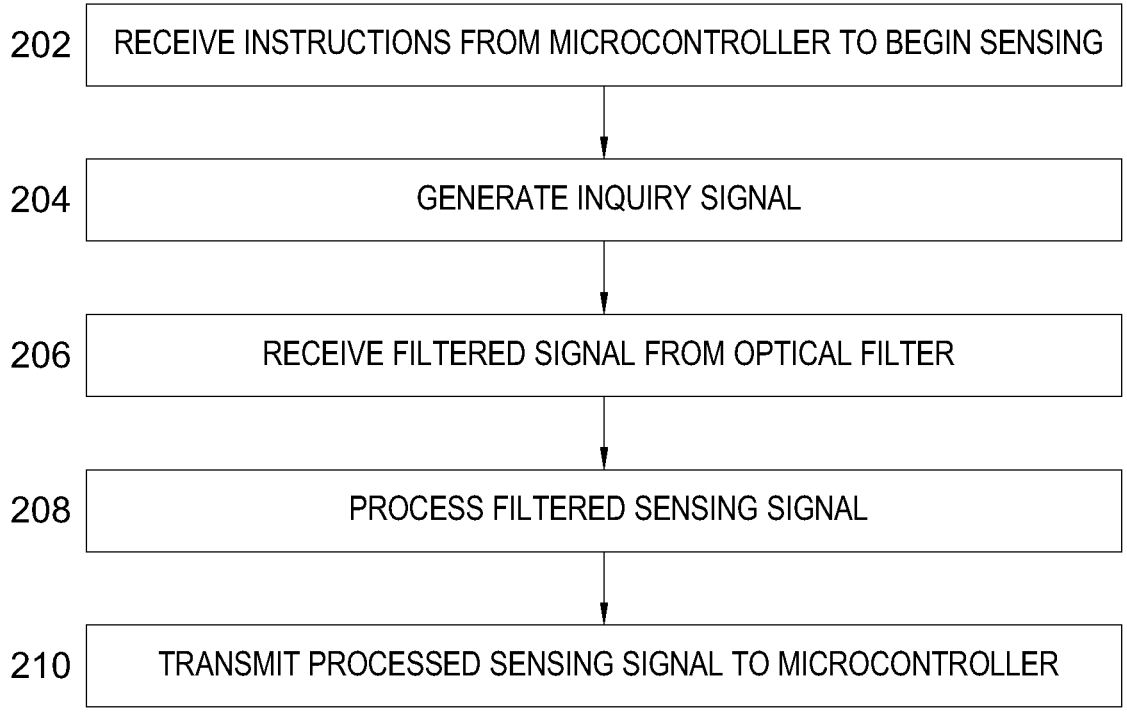
FIG. 2 illustrates a process implemented by an engine within the mobile communications device of FIG. 1 to control the amount of audio generated in the ear.

FIG. 2 illustrates an example of a process implemented by the engine 110 within the mobile communications device 102 of FIG. 1 to control the amount of audio generated in the user's ear 105. As indicated by FIG. 2, the engine 110 receives, at 202, an instruction from the microcontroller 120 to initiate/begin sensing of proximity and/or ambient light.

The engine 110 generates, at 204, an inquiry signal for sensing the parameter to the laser 122. The laser 122 converts the inquiry signal to an inquiry laser signal. The optical device 124 concentrates or disperses, the concentrated/dispersed signal to generate an optically processed inquiry signal. The optically processed inquiry signal interacts with the user's ear 105 and returns (e.g., by reflection from the ear) to the optical device 126. The returned/reflective signal is indicative of the proximity and/or ambient light. The optical device 126 concentrates or disperses the reflected signal. The optical filter 128 optically filters the concentrated or dispersed signal in order for the indication to be understood by (i.e., compatible with) the engine 110.

The engine 110 receives, at 206, the filtered signal, which indicates the values of the proximity of the user and the ambient light.

The engine 110 processes, at 208, the filtered signal. Such processing can include converting analog data to digital data so as to enable communication between the engine 110 and the microcontroller 120.

The engine 110 can transmit, at 210, the digital values of the processed signal indicative of proximity and ambient light to the microcontroller 120, which can in turn control the signal generation apparatus 114 based on the proximity and ambient light values.

Figure 3:
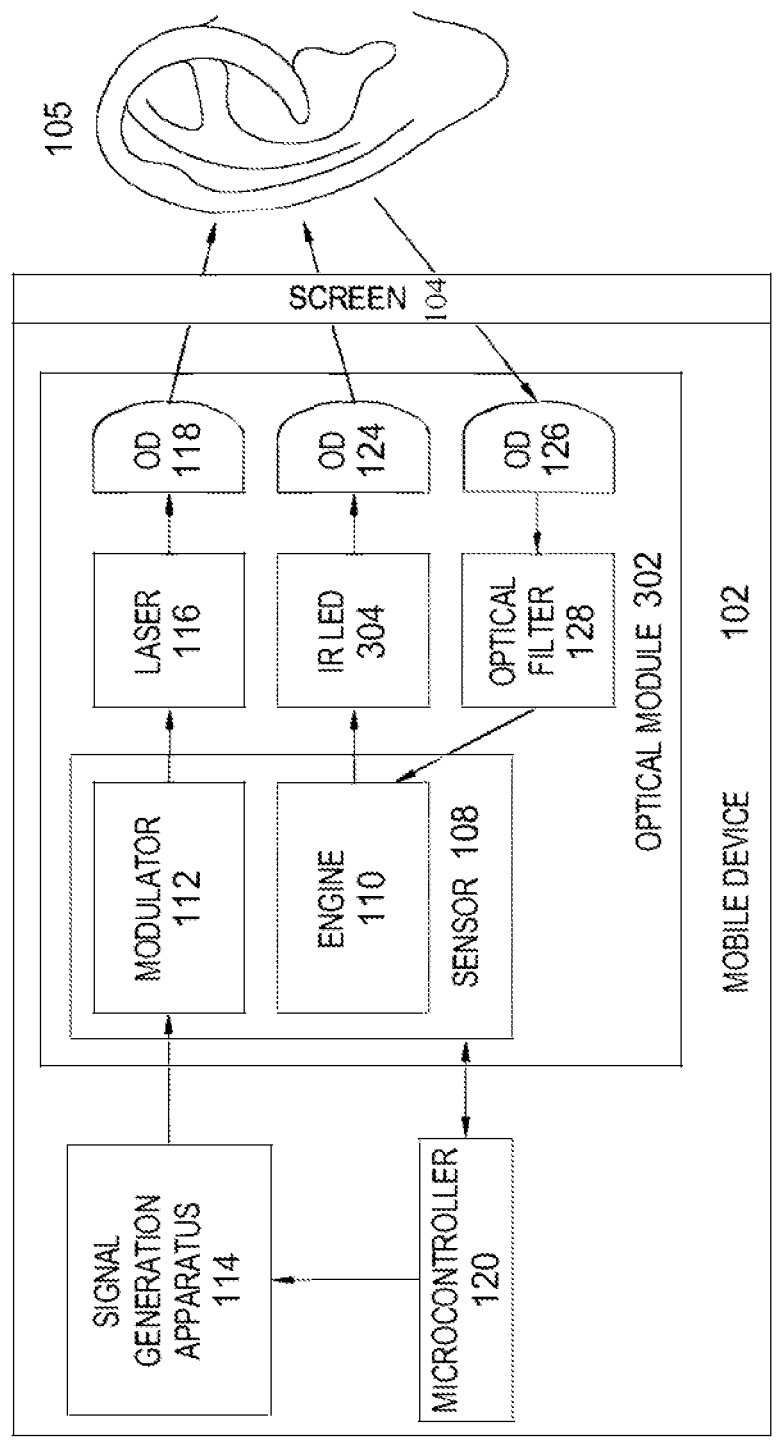
FIG. 3 illustrates an example of an optical module within the mobile communications device.

FIG. 3 illustrates a variation 302 of the optical module 106 within the mobile communications device 102. The optical module 302 includes an infrared light emitting diode (LED) 304 instead of the laser 122 in FIG. 1. Other than the functionality of the infrared LED 302, the remaining functionality of the optical module 302 can be identical, or similar, in other implementations, to that of the optical module 106.

Figure 4:
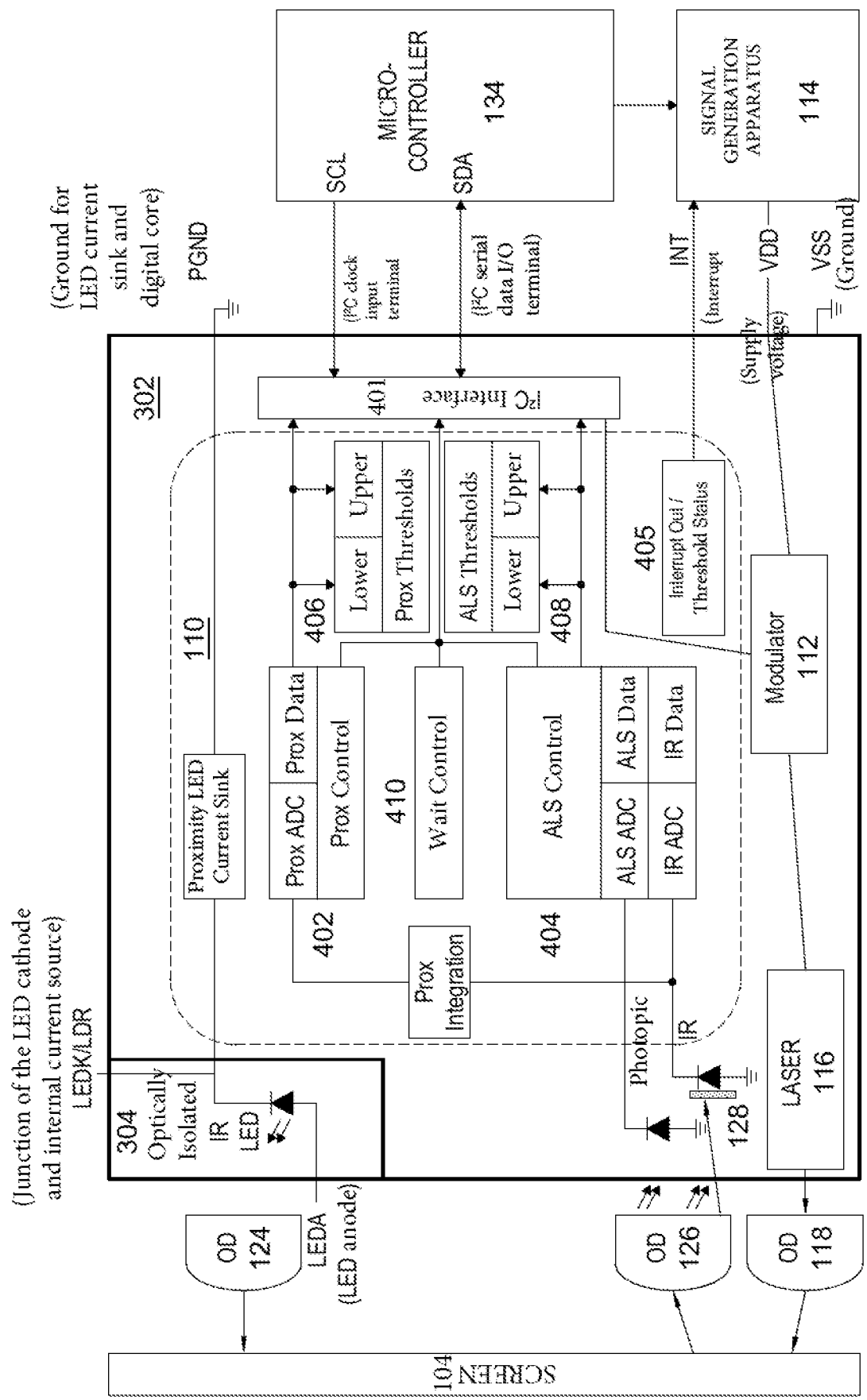
FIG. 4 illustrates an implementation of the optical module of FIG. 3.

FIG. 4 illustrates one implementation of the optical module 302 of FIG. 3. As shown in FIG. 4, the optical module 302 is communicatively coupled to the microcontroller 134 via the I$^2$C interface 401. The engine 110 can include a proximity module (which can include a microcontroller) 402 for measuring the proximity of the user to the mobile communications device 102, and an ambient light sensing (ALS) module 404 for sensing ambient light. Each module can include the same set or a separate respective sets of one or more microprocessors. The proximity module 402 can perform proximity sensing by photo-detection of reflected infrared energy produced by the infrared LED 304. Detect/release events can be interrupt driven (see 405), and can occur when proximity result crosses upper and/or lower threshold settings. The proximity module 402 can offset adjustment registers to compensate for unwanted infrared energy reflection in the optical module 302. Proximity results can be improved further by automatic ambient light sensing enabled by the ALS module 404. The ALS module 404 can provide photopic light intensity data. The ALS photodiode can have, for example, ultraviolet and infrared blocking filters and a dedicated data converter that can produce 16-bit data. This architecture can allow the engine 110 to measure ambient light accurately.

The proximity module 402 and the ALS module 404 can receive instructions from the microcontroller 120 via the I$^2$C interface 401. These instructions can instruct the modules, for example, to initiate sensing proximity and ambient light, respectively. The proximity module 402 and the ALS module 404 can receive the filtered signal from the optical filter 128. The filtered signal can indicate the value of the sensed proximity and/or ambient light. The proximity module 402 and the ALS module 404 can process the filtered sensing signal based on lower and upper proximity thresholds 406 and lower and upper ALS thresholds 408, respectively. The proximity module 402 and the ALS module 404 then can transmit, at different times, the processed signal to the microcontroller 120 via an I²C interface 401.

The microcontroller 134 can instruct the signal generation apparatus 114 to generate a signal with a value based on the value of the sensed proximity and/or ambient light. The modulator 112 can modulate the signal, which can pass through the laser 116. The laser 116 can convert the signal into a modulated laser signal, which can pass through the optical device 118, and then through the screen 104 to the user. The laser signal from the laser 116 can interact with humidity (e.g., water vapor) in the user's ear 105 to generate audio in the ear (or in the immediate vicinity of the ear).

Figure 5:
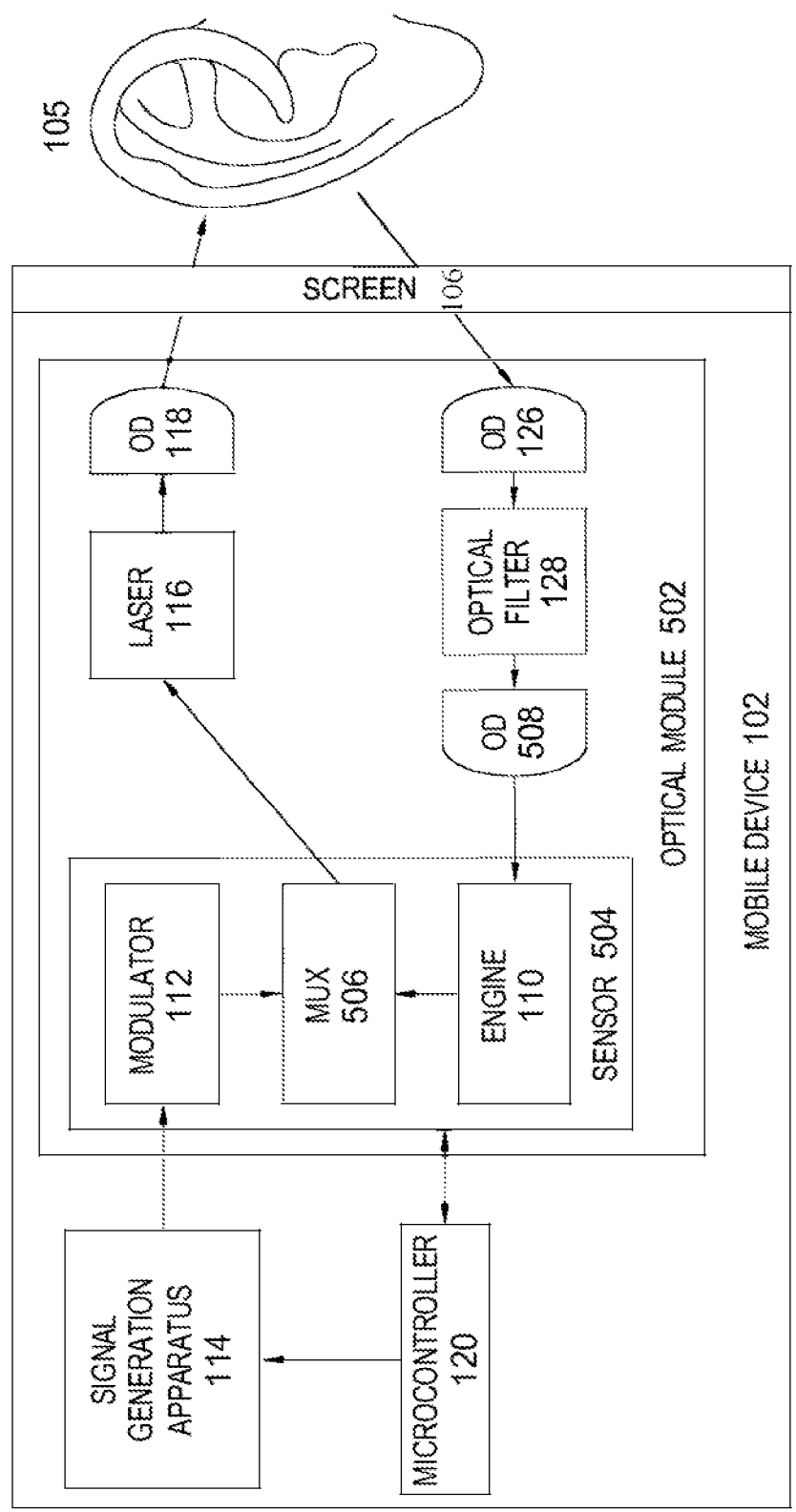
FIG. 5 illustrates another implementation of the optical module within the mobile communications device.

FIG. 5 illustrates another implementation 502 of the optical module 106 within the mobile communications device 102. In the optical module 502, a single laser 116 and a single optical device 118 are used (instead of two lasers 116, 122 and two optical devices 118, 124 in the optical module 106) to transmit a multiplexed signal, which is one of the following two multiplexed signals: (a) an inquiry signal to determine proximity and/or ambient light, or (b) a signal generated by the signal generation apparatus 114. The optical module 502 can include a sensor 504 that includes, in addition to the components of the sensor 108 of the optical module 106, the multiplexer 506 that performs the foregoing multiplexing. The multiplexer 506 can send the multiplexed signal to the laser 116, which then can be transmitted to the optical device 118 and then to the ear 105. Accordingly, both the inquiry signal and the signal for causing the audio to be generated in the ear 105 are passed through the laser 116 and the optical device 118. The filtered signal can pass through the optical detector 508 before passing to the engine 110. The optical detector 508 may be required because the optical module 502 needs to convert the 1.9 μm wavelength signal into an electrical signal, whereas standard complementary metal-oxide-semiconductor (CMOS) processes may only be sensitive for signals having wavelengths up to approximately 1.1 μm.

Figure 6:
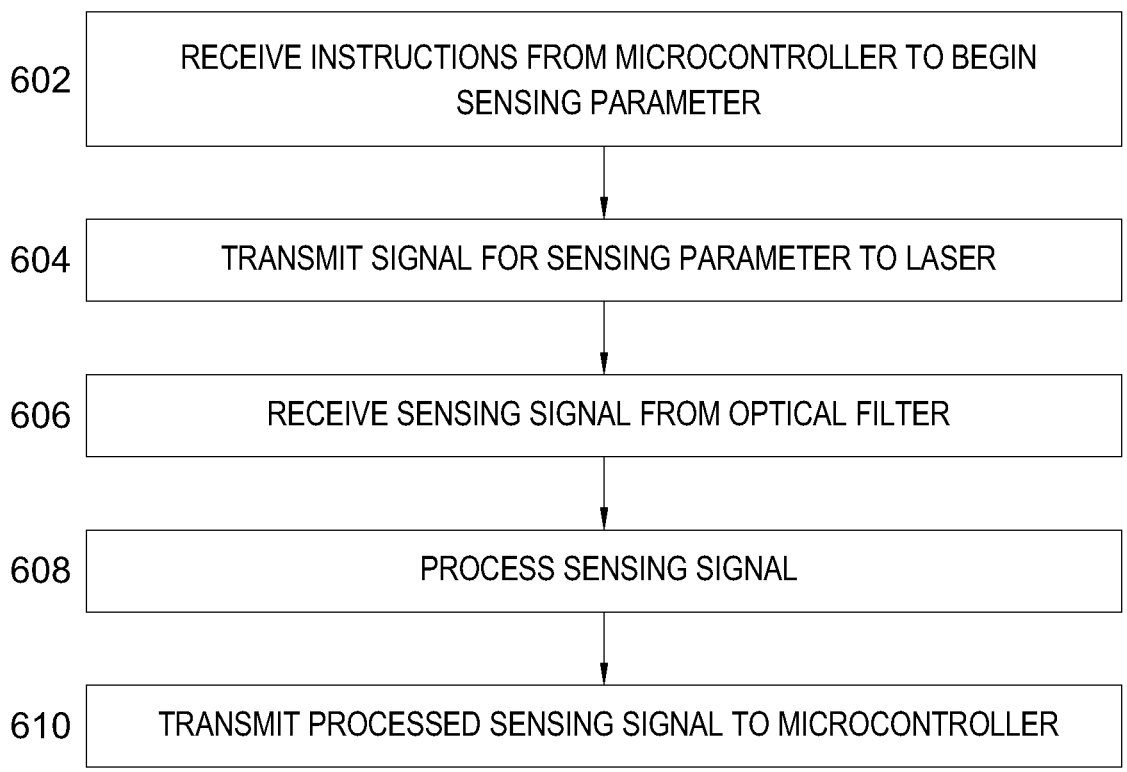
FIG. 6 illustrates an example of a process implemented by the engine within the mobile communications device of FIG. 5 to control the amount of audio generated in the ear.

FIG. 6 illustrates an example of a process implemented by the engine 110 within the mobile communications device 102 of FIG. 5 to control the amount of audio generated in the ear 105. The engine 110 receives, at 602, instructions from the microcontroller 120 to begin sensing proximity of the user from the mobile communications device 102 and/or ambient light. The engine 110 sends, at 604, an inquiry signal for sensing the proximity to the laser 116 via the multiplexer 506. The inquiry signal can subsequently pass through the optical device 118, and then through the screen 104 and subsequently to the ear 105. The sensing signal can be returned from the ear, and the returned/reflected signal then can pass through the screen 104, optical device 126, and the optical filter 128.

As indicated by FIG. 6, the engine 110 receive, at 606, a filtered signal from the optical filter 128. The filtered signal can indicate the value of the sensed proximity and/or ambient light. The engine 124 processes, at 608, the filtered signal. The engine 110 transmits, at 610, the processed sensing signal to the microcontroller 120. The microcontroller 120 instructs the signal generation apparatus 114 to generate a signal with a value based on the value of the sensed proximity and/or ambient light. The modulator 112 modulates the audio signal, which can pass through the laser 116 via the multiplexer 506. The laser 116 can convert the audio signal into a laser signal, which can pass through the optical device 118, and then traverses through the screen 106 to the ear 105.

Various implementations of the subject matter described herein can be implemented in digital electronic circuitry, integrated circuitry, specially designed application specific integrated circuits (ASICs), computer hardware, firmware, software, and/or combinations thereof. These various implementations can be implemented in one or more computer programs. These computer programs can be executable and/or interpreted on a programmable system. The programmable system can include at least one programmable processor, which can be have a special purpose or a general purpose. The at least one programmable processor can be coupled to a storage system, at least one input device, and at least one output device. The at least one programmable processor can receive data and instructions from, and can transmit data and instructions to, the storage system, the at least one input device, and the at least one output device.

These computer programs (also known as programs, software, software applications or code) can include machine instructions for a programmable processor, and can be implemented in a high-level procedural and/or object-oriented programming language, and/or in assembly/machine language. As can be used herein, the term "machine-readable medium" can refer to any computer program product, apparatus and/or device (for example, magnetic discs, optical disks, memory, programmable logic devices (PLDs)) used to provide machine instructions and/or data to a programmable processor, including a machine-readable medium that can receive machine instructions as a machine-readable signal. The term "machine-readable signal" can refer to any signal used to provide machine instructions and/or data to a programmable processor.

Although various implementations have been described in detail above, other modifications can be possible. For example, the logic flows depicted in the accompanying figures and described herein do not require the particular order shown, or sequential order, to achieve desirable results. Other embodiments may be within the scope of the following claims.

The invention claimed is:

1. A mobile communications device comprising:
   a display screen;
   a sensor including a modulator operable to produce a modulated signal based on a signal from a signal generator, the sensor being configured to detect proximity of a user from the sensor; and
   a laser operable to produce a modulated output laser signal based on the modulated signal, the modulated output laser signal passing through the display screen for interaction with water vapor in an ear of a user of the mobile communications device to generate audio.

2. The device of claim 1, wherein the sensor includes at least one microprocessor configured to perform the detection of the proximity.

3. The device of claim 2, wherein the at least one microprocessor is coupled to a microcontroller and the microcontroller is configured to control, based on the detection of the proximity, generation of the signal by the signal generation apparatus.

4. The device of claim 1, wherein the sensor is further configured to detect ambient light in vicinity of the sensor.

5. The device of claim 4, wherein the sensor includes at least one microprocessor configured to perform the detection of the ambient light.

6. The device of claim 5, wherein the at least one microprocessor is coupled to a microcontroller and the microcontroller is configured to control, based on the detection of the ambient light, generation of the signal by the signal generation apparatus.

7. The device of claim 1, wherein the laser has a near-infrared wavelength.

8. The device of claim 7, wherein the near-infrared wavelength is 1.9 μm.

9. A method comprising:
generating, by a signal generation apparatus within a mobile communications device, a signal quantified based on at least one of ambient light and proximity of a user of the mobile communications device;
modulating, by a modulator within the mobile communications device, the signal to generate a modulated signal;
producing, by a laser within the mobile communications device, a modulated output laser signal based on the modulated signal; and
transmitting, via an optical device within the mobile communications device, the modulated output laser signal through a display screen of the mobile communications device, the modulated output laser signal interacting with water vapor in an ear of a user of the mobile communications device to generate audio.

10. The method of claim 9, wherein the laser has a near-infrared wavelength.

11. The method of claim 10, wherein the near-infrared wavelength is between 0.7 μm and 5 μm, optionally wherein the near-infrared wavelength is 1.9 μm.

12. The method of claim 9, wherein the display screen does not have an audio opening.

13. The method of claim 9, wherein the audio is audible when the ear of the user is at a distance between zero millimeters and 1.5 centimeters from the mobile communications device.

14. A system comprising:
at least one programmable processor of a sensor located within a mobile communications device; and
a machine-readable medium storing instructions that, when executed by the at least one processor, cause the at least one programmable processor to perform operations comprising:
receiving an instruction from a microcontroller to begin detection of at least one of proximity of a user of the mobile communications device from the sensor and ambient light;
detecting, in response to the receipt of the instruction, values of the proximity and ambient light; and
transmitting the values of the proximity and the ambient light to the microcontroller, the microcontroller instructing a signal generation apparatus to generate a signal quantified based on the values of the proximity and the ambient light, the signal being modulated by a modulator within the sensor to generate a modulated signal, a laser producing a laser signal coupled to the sensor the modulated signal being converted into a modulated output laser signal by, the modulated output laser signal passing through a display screen of the mobile communications device for interaction with water vapor in an ear of a user of the mobile device to generate audio.

15. The system of claim 14, wherein the laser has a near-infrared wavelength, optionally wherein the near-infrared wavelength is 1.9 μm.

16. The system of claim 14, wherein the display screen does not have an audio opening.

17. The system of claim 14, wherein the audio is audible when the ear of the user is at a distance between zero millimeters and 1.5 centimeters from the mobile communications device.

18. The system of claim 14, wherein the laser is a vertical-cavity surface-emitting laser (VCSEL).

19. A mobile communications device comprising:
a display screen that does not include an audio opening;
an optical module including a sensor;
a modulator operable to produce a modulated signal based on a signal from a signal generator; and
a laser operable to produce a modulated output laser signal based on the modulated signal, the modulated output laser signal passing through the display screen for interaction with water vapor in an ear of a user of the mobile communications device to generate audio.

20. A mobile communications device comprising:
a display screen;
a sensor including a modulator operable to produce a modulated signal based on a signal from a signal generator, the sensor being configured to detect ambient light in vicinity the sensor; and
a laser operable to produce a modulated output laser signal based on the modulated signal, the modulated output laser signal passing through the display screen for interaction with water vapor in an ear of a user of the mobile communications device to generate audio.

21. The device of claim 20, wherein the sensor includes at least one microprocessor configured to perform the detection of the ambient light.

22. The device of claim 21, wherein the at least one microprocessor is coupled to a microcontroller and the microcontroller is configured to control, based on the detection of the ambient light, generation of the signal by the signal generation apparatus.

* * * * *